LESTER L. JONES
*INVENTOR.*

BY J. M. St. Amand
ATTORNEY

June 30, 1964 L. L. JONES 3,139,619

MISSILE MOUNTED LOOP ANTENNA WITH VIBRATION RESISTANT SERIES CAPACITORS

Filed Dec. 22, 1961 2 Sheets-Sheet 2

LESTER L. JONES
*INVENTOR.*

BY J. M. St. Amand

ATTORNEY

United States Patent Office 3,139,619

Patented June 30, 1964

3,139,619

MISSILE MOUNTED LOOP ANTENNA WITH VIBRATION RESISTANT SERIES CAPACITORS

Lester L. Jones, Oradell, N.J., assignor, by mesne assignments, to the United States of America as represented by the Secretary of the Navy Filed Dec. 22, 1961, Ser. No. 161,752
9 Claims. (Cl. 343—705)

The invention herein described may be manufactured and used by or for the Government of the United States of America for governmental purposes without the payment of any royalties thereon or therefor.

The present invention relates to radiating oscillator loops and more particularly to constructing radiating oscillator loops, such as radiating loops which surround the oscillator catacomb, in which electronic components are firmly imbedded, in a missile structure. Such loops must expand with temperature expansion of the catacomb and remain tight through the entire range of ambient temperature to prevent mechanical disturbances due to vibrations so as to effectively eliminate unwanted signals that might otherwise occur. These loops may consist of a band of high conductivity metal with one or more capacitors in series to form an oscillatory circuit. Mechanical disturbances usually arise when operation in a wide range of ambient temperature is required, which makes it difficult to bind a loop to a catacomb so that no relative motion can occur between them. If not so bound, then vibration to which the equipment is subjected gives rise to unwanted signals.

A limited number of supporting dielectric materials are available because of physical and electrical limitations, and these generally have widely different and higher temperature coefficients of expansion from the loop metal. Since the linear dimensions involved may be relatively large, only a moderate temperature change may be required to produce considerable looseness.

A loop is needed which will permit sufficient expansion and has high circumferential tension in order to remain tight around the catacomb throughout the entire desired range of ambient temperature. The capacitors in series with the loop must be capable of supporting this high tension without perceptible change. Existing capacitors of the necessary limited dimensions and high Q are not suitable for this purpose.

The present invention provides radiating oscillator loops having the aforementioned desired properties and the necessary tensile strength across terminals, without causing an increase of losses or dimensions.

An object of the present invention is to provide a radiating oscillator loop that prevents mechanical disturbance due to changes in temperature and which forms an oscillatory circuit of very low resistance.

Another object of the invention is to provide a radiating electrical oscillator loop which forms an oscillatory circuit having a high Q and which is immune to mechanical disturbances due to temperature changes over a wide range of ambient temperature.

A further object of the invention is to provide a novel radiating oscillator loop which will remain tight about its support over a wide range of temperature to effectively eliminate unwanted signals caused by vibration.

Still another object of the invention is to provide a novel radiating oscillator loop for guided missiles and rockets.

Other objects and many of the attendant advantages of this invention will become readily appreciated as the same becomes better understood by reference to the following detailed description when considered in connection with the accompanying drawings wherein.

Referring now to the drawings, like numerals refer to like parts in each of the figures.

Figure 1:
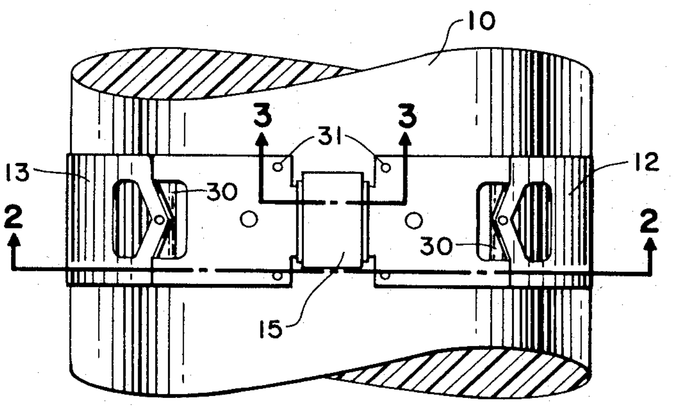
FIGURE 1 is a side view of an oscillator loop showing an embodiment of the present invention mounted about a section of missile structure.
Figure 2:
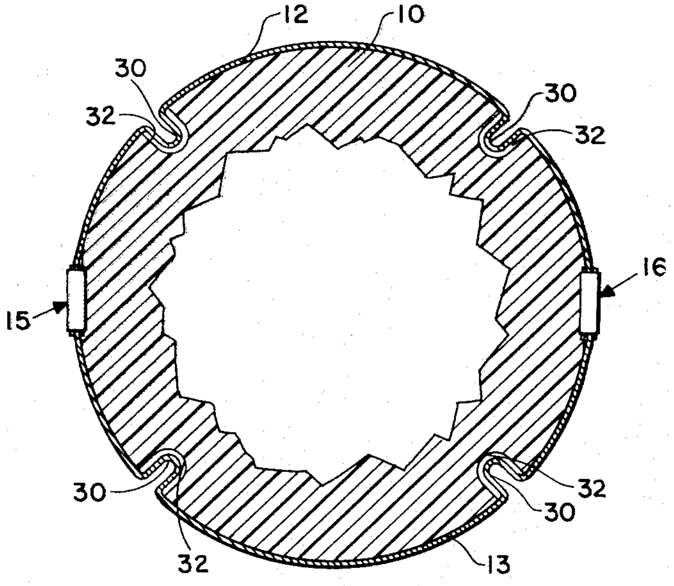
FIGURE 2 is a view of the oscillator loop taken along line 2—2 of FIGURE 1.

In the presently described embodiment of the invention, a radiating oscillator loop is shown in FIGURES 1 and 2 mounted about a section of supporting structure 10 of dielectric material, such as the oscillator catacomb, in a missile structure, in which electronic components are firmly imbedded. The loop is formed from two metal spring sections 12 and 13 connected together to form a loop about supporting structure 10 by means of capacitors 15 and 16.

Figure 3:
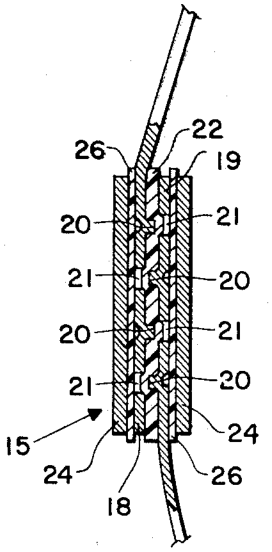
FIGURE 3 is an enlarged detailed cross-section of the capacitor assembly taken along section line 3—3 of FIGURE 1.
Figure 4:
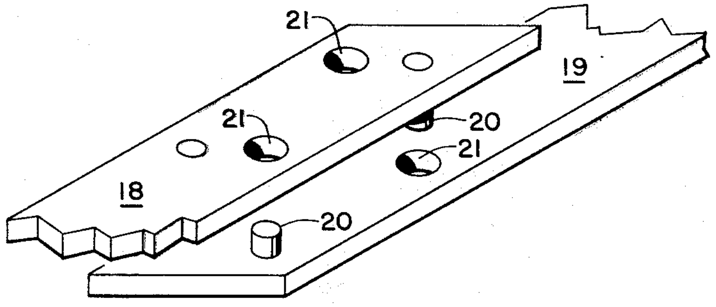
FIGURE 4 is a detailed perspective view of a pair of overlapping capacitor electrodes.

The essential feature in the construction of capacitors 15 and 16 is in providing the capacitor electrodes 18 and 19 with interlocking projections 20 and recesses 21 that are separated by portions of dielectric material 22 between the electrodes and approximately normal to the plane of the electrodes, as shown in FIGURE 3. The projections 29 may be cylindrical in form, as shown, and may be extruded from the surface of the electrode. The recesses are holes punched through the electrode. All the projections 20 may be in one electrode and all the holes in the other electrode, if so desired; however, a preferred arrangement is, as shown in FIGURES 3 and 4, where the projections 20 and recesses 21 are alternately placed in both electrodes 18 and 19. The advantages of this arrangement are: that a larger number of interlocks may be placed in a given area; that the capacities between each electrode and retaining clamp 24, FIGURE 3, are equalized, as hereinafter discussed; and that only one punch and die set is needed for both electrodes.

Figure 5:
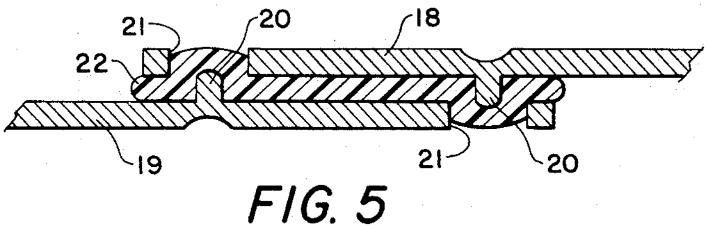
FIGURE 5 is a detailed cross-section of a pair of capacitor electrodes, showing projections and recesses, and dielectric material pressed therebetween.

The dielectric 22 used in capacitors 15 and 16 is preferably a material that is relatively soft and plastic. Suitable materials having low electrical loss are polyethylene, for low temperature ranges and Teflon plastic for high temperature ranges. FIGURE 5 shows a section of the electrode arrangement of FIGURE 4 with such a dielectric 22 pressed between electrodes 18 and 19. Dielectric 22 may be preformed to facilitate proper assembly or the electrodes 18 and 19 may be positioned in a jig and used for forming the plastic dielectric. Capacitors 15 and 16 may be insulated with sheets of insulation 26 of the same material as dielectric 22. Insulation sheets 26 may be of different thicknesses depending on the range of capacity desired.

Figure 6:
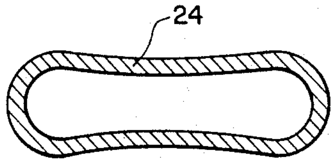
FIGURE 6 shows a cross-section of a clamp used for holding the capacitor assembly together in compression.

Insulation 26, electrodes 18 and 19, and dielectric material 22 may be held in compression by inserting them between a clamp 24 formed from a section of partially preflattened metal tubing. When a short section of thin wall tubing is flattened between flat plates it takes a shape, as shown in cross-section in FIGURE 6. When retaining clamp 24 is further flattened with electrodes 18 and 19, and dielectric materials 22 and 26 therebetween, it creates a fairly uniform pressure over its entire flat area. If insulation sheets 26 of equal thickness are used on both sides of the electrode assembly then retaining clamp 24 will have a potential midway between the electrodes. This is an advantage in some circuits where the mid potential is the ground potential.

The total capacitance of capacitors 15 and 16 may be adjusted to close values by suitably over-compressing retaining clamp 24 so that some of plastic dielectric 22 and 26 is extruded from the ends. The memory characteristics of the aforementioned suggested plastics for dielectric materials causes them to retract and fill voids created by any spring back of clamp 24 when external pressure is removed. A cross-section of a complete capacitor assembly is as shown in FIGURE 3.

Figure 7:
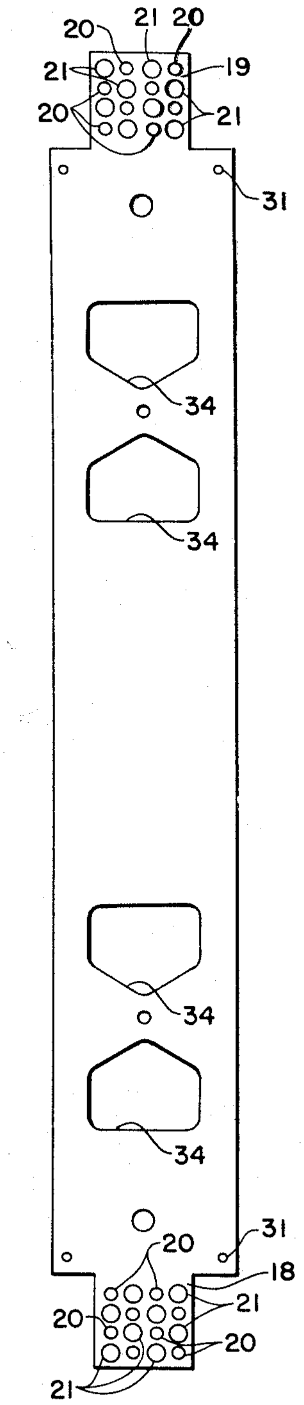
FIGURE 7 is a plane view of a flat punched metal strip used in forming a preferred spring section.

With the type of capacitors as described above it is practical to use high circumferential tensions to bind the oscillator loop, formed from spring sections 12 and 13 and capacitors 15 and 16, to the catacomb or supporting structure 10. The desired tension may be developed by spring elements 30 formed in spring sections 12 and 13. A flat punched metal strip used in forming spring sections 12 and 13 is shown in FIGURE 7. Springs 30 are located to minimize motion in regions where electrical connections are made to the loop. A preferred arrangement has four spring elements 30, equally spaced around the loop circle and around the points of electrical connection 31, as shown in FIGURE 2.

The springs 30 are of shallow U-shaped cross-section, preferably turned inwardly, formed from the loop metal, as shown in FIGURE 2. Springs 30 project into notches 32 in oscillator catacomb 10, as shown.

The springs 30 are shaped so as to allow maximum expansion and contraction of the loop. In a preferred embodiment, portions of the metal strip, where the U-shaped spring is formed, are punched out, at 34, as shown in FIGURES 1 and 7, to distribute the bending stresses more uniformly and yet not reduce the loop conductivity too much.

Obviously many modifications and variations of the present invention are possible in the light of the above teachings. It is therefore to be understood that within the scope of the appended claims the invention may be practiced otherwise than as specifically described.

What is claimed is:

1. A radiating oscillator loop comprising:
(*a*) a plurality of spring sections the ends of which form capacitor electrodes,
(*b*) a loop formed from said spring sections by connecting them together end to end,
(*c*) said connections being made by overlapping an electrode on one end of one of said plurality of spring sections with an electrode on one end of another of said spring sections with a yieldable dielectric material sandwiched therebetween,
(*d*) said electrodes each having a plurality of recesses therein and projections from one face thereof in a pattern such that overlapping electrodes will tend to interlock by the projections on one electrode being inserted into the recesses in the other electrode,
(*e*) means for holding said overlapping electrodes with said dielectric therebetween together in compression, thus forming a radiating electrical oscillator loop.

2. A radiating oscillator loop comprising:
(*a*) a plurality of spring sections the ends of which form capacitor electrodes,
(*b*) a loop formed from said spring sections by connecting them together end to end,
(*c*) said connections being made by overlapping an electrode on one end of one of said plurality of spring sections with an electrode on one end of another of said spring sections with a yieldable dielectric material sandwiched therebetween,
(*d*) means for holding said overlapping electrodes with said dielectric therebetween together in compression,
(*e*) U-shaped spring elements formed in said spring sections for allowing maximum expansion and contraction of the loop.

3. A radiating oscillator loop comprising:
(*a*) a plurality of spring sections the ends of which form capacitor electrodes,
(*b*) said spring sections being formed from flat elongated strips of springy metal having high electrical conductivity,
(*c*) a loop formed from said spring sections by connecting them together end to end,
(*d*) said connections being made by overlapping an electrode on one end of one of said plurality of spring sections with an electrode on one end of another of said spring sections with a yieldable dielectric material sandwiched therebetween,
(*e*) means for holding said overlapping electrodes with said dielectric therebetween together in compression,
(*f*) U-shaped spring elements formed in said spring sections for allowing maximum expansion and contraction of the loop.

4. A radiating oscillator loop comprising:
(*a*) a plurality of spring sections the ends of which form capacitor electrodes,
(*b*) said spring sections being formed from flat elongated strips of springy metal having high electrical conductivity,
(*c*) a loop formed from said spring sections by connecting them together end to end,
(*d*) said connections being made by overlapping an electrode on one end of one of said plurality of spring sections with an electrode on one end of another of said spring sections with a yieldable dielectric material sandwiched therebetween,
(*e*) means for holding said overlapping electrodes with said dielectric therebetween together in compression,
(*f*) U-shaped spring elements formed in said spring sections for allowing maximum expansion and contraction of the loop,
(*g*) said spring sections having portions of the metal from the U-shaped spring elements and adjoining metal punched out to distribute bending stresses more uniformly without impairing the loop conductivity.

5. A radiating oscillator loop comprising:
(*a*) a plurality of spring sections the ends of which form capacitor electrodes,
(*b*) said spring sections being formed from flat elongated strips of springy metal having high electrical conductivity,
(*c*) a loop formed from said spring sections by connecting them together end to end,
(*d*) said connections being made by overlapping an electrode on one end of one of said plurality of spring sections with an electrode on one end of another of said spring sections with a yieldable dielectric material sandwiched therebetween,
(*e*) said electrodes each having a plurality of recesses therein and projections from one face thereof in a pattern such that overlapping electrodes will tend to interlock by the projections on one electrode being inserted into the recesses in the other electrode,
(*f*) means for holding said overlapping electrodes with said dielectric therebetween together in compression,
(*g*) U-shaped spring elements formed in said spring sections for allowing maximum expansion and contraction of the loop,
(*h*) said spring sections having portions of the metal from the U-shaped spring elements and adjoining metal punched out to distribute bending stresses more uniformly without impairing the loop conductivity.

6. A device as in claim 5 wherein plastic dielectric material is wrapped about the overlapping electrodes and said holding means comprises a flattened section of metal tubing.

7. A device as in claim 5 wherein capacitance can be adjusted to close values by varying the compression of said holding means.

8. In a missile structure having an oscillator catacomb in which electronic components are embedded, a radiating oscillator loop comprising:

(*a*) a plurality of spring sections the ends of which form capacitor electrodes, (*b*) said spring sections being formed from flat elongated strips of springy metal having high electrical conductivity, (*c*) a loop formed from said spring sections and mounted about the oscillator catacomb by connecting them together end to end, (*d*) said connections being made by overlapping an electrode on one end of one of said plurality of spring sections with an electrode on one end of another of said spring sections with a yieldable dielectric material sandwiched therebetween, (*e*) means for holding said overlapping electrodes with said dielectric therebetween together in compression, (*f*) said loop mounted about said oscillator catacomb being capable of expanding with temperature changes along with any expansion of the oscillator catacomb with the prevention of mechanical disturbances that might otherwise give rise to unwanted signals.

9. In a missile structure having an oscillator catacomb in which electronic components are embedded, a radiating oscillator loop comprising:

(*a*) a plurality of spring sections the ends of which form capacitor electrodes, (*b*) said spring sections being formed from flat elongated strips of springy metal having high electrical conductivity, (*c*) a loop formed from said spring sections and mounted about the oscillator catacomb by connecting them together end to end, (*d*) said connections being made by overlapping an electrode on one end of one of said plurality of spring sections with an electrode on one end of another of said spring sections with a yieldable dielectric material sandwiched therebetween, (*e*) said electrodes each having a plurality of recesses therein and projections from one face thereof in a pattern such that overlapping electrodes will tend to interlock by the projections on one electrode being inserted into the recesses in the other electrode, (*f*) means for holding said overlapping electrodes with said dielectric therebetween together in compression, (*g*) U-shaped spring elements formed in said spring sections for allowing maximum expansion and contraction of the loop, (*h*) said catacomb having recesses therein into which the U-shaped spring elements of said spring sections protrude, the recesses in said catacomb being of sufficient size to permit expansion of the U-shaped spring elements, (*i*) said loop mounted about said oscillator catacomb being capable of expanding with temperature changes along with any expansion of the oscillator catacomb with the prevention of mechanical disturbances that might otherwise give rise to unwanted signals.

References Cited in the file of this patent

UNITED STATES PATENTS 2,311,872 Rote ------------------- Feb. 23, 1943
2,881,429 Radcliffe ---------------- Apr. 7, 1959